(12) United States Patent
Cui et al.

(10) Patent No.: US 11,204,247 B2
(45) Date of Patent: Dec. 21, 2021

(54) METHOD FOR UPDATING A MAP AND MOBILE ROBOT

(71) Applicants: ANKOBOT (SHENZHEN) SMART TECHNOLOGIES CO., LTD., Guangdong (CN); ANKOBOT (SHANGHAI) SMART TECHNOLOGIES CO., LTD., Shanghai (CN)

(72) Inventors: Yuwei Cui, Shanghai (CN); Wei Li, Shenzhen (CN)

(73) Assignees: ANKOBOT (SHENZHEN) SMART TECHNOLOGIES CO., LTD., Shenzhen (CN); ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 250 days.

(21) Appl. No.: 16/663,293

(22) Filed: Oct. 24, 2019

(65) Prior Publication Data
US 2020/0356582 A1 Nov. 12, 2020

Related U.S. Application Data

(63) Continuation of application No. PCT/CN2019/086281, filed on May 9, 2019.

(51) Int. Cl.
*G06K 9/00* (2006.01)
*G01C 21/00* (2006.01)
(Continued)

(52) U.S. Cl.
CPC ........... *G01C 21/005* (2013.01); *G01C 21/20* (2013.01); *G05D 1/0253* (2013.01);
(Continued)

(58) Field of Classification Search
CPC .. G01C 21/005; G01C 21/20; G01C 21/3804; G01C 21/206; G01C 21/165;
(Continued)

(56) References Cited

U.S. PATENT DOCUMENTS

| | | | | | |
|---|---|---|---|---|---|
| 6,032,098 | A | * | 2/2000 | Takahashi | G01C 21/28 701/23 |
| 6,125,326 | A | * | 9/2000 | Ohmura | G01S 19/03 701/454 |

(Continued)

FOREIGN PATENT DOCUMENTS

| | | |
|---|---|---|
| CN | 101953172 A | 1/2011 |
| CN | 105203094 A | 12/2015 |

(Continued)

OTHER PUBLICATIONS

International Search Report and Written Opinion for Application No. PCT/CN2019/086281, dated Feb. 13, 2020, 11 pages.

*Primary Examiner* — Mahendra R Patel
(74) *Attorney, Agent, or Firm* — Leber IP Law; David C. Robertson

(57) ABSTRACT

The present application provides a method for updating a map and a mobile robot. The method comprises: acquiring a current map and a corresponding current location data set constructed when a first movement device performs a navigation and movement operation in a physical space, wherein the first movement device performs the navigation and movement operation based on a reference map and a corresponding reference location data set which are corresponding to the physical space and stored in advance; performing a data fusion process on the reference map and the corresponding reference location data set as well as the current map and the corresponding current location data set; taking a map and a corresponding location data set after being data fusion processed as a new reference map and a correspond- (Continued)

ing new reference location data set in the first movement device. The present application provides a solution for persistence of a map.

19 Claims, 3 Drawing Sheets

(51) Int. Cl.
*G06T 7/73* (2017.01)
*G01C 21/20* (2006.01)
*G05D 1/02* (2020.01)

(52) U.S. Cl.
CPC .......... *G05D 1/0274* (2013.01); *G06T 7/74* (2017.01); *G06T 2207/30252* (2013.01)

(58) Field of Classification Search
CPC . G01C 21/32; G06T 7/74; G06T 2207/30252; G05D 1/0253; G05D 1/0274; G05D 2201/0203; G05D 1/0246; G05D 1/0236; G05D 1/024; G05D 1/0242; G05D 1/0223; G05D 1/0221; G05D 1/0278; G05D 1/0276; G05D 2201/0216; G01S 19/49
USPC ......................................... 382/154
See application file for complete search history.

(56) References Cited

U.S. PATENT DOCUMENTS

| | | | | |
|---|---|---|---|---|
| 6,256,578 B1* | 7/2001 | Ito | ........................ | G01C 21/26 340/990 |
| 7,974,781 B2* | 7/2011 | Emoto | ................ | G01C 21/3638 701/436 |
| 9,723,251 B2* | 8/2017 | Slotky | ...................... | H04N 5/77 |
| 9,797,732 B2* | 10/2017 | Li | ........................ | G01C 21/20 |
| 10,027,952 B2* | 7/2018 | Karvounis | ........... | G06K 9/6248 |
| 10,352,707 B2* | 7/2019 | Kordari | ................ | G01C 21/383 |
| 2001/0020213 A1* | 9/2001 | Hatano | ................... | G01C 21/32 701/420 |
| 2009/0043504 A1* | 2/2009 | Bandyopadhyay | ..... | G01S 19/48 701/469 |
| 2011/0207471 A1* | 8/2011 | Murray | ................... | G01S 19/49 455/456.1 |
| 2012/0143495 A1* | 6/2012 | Dantu | ................... | G01C 21/206 701/428 |
| 2013/0177208 A1* | 7/2013 | Haverinen | ........... | G01C 21/206 382/103 |
| 2013/0321398 A1* | 12/2013 | Howard | ................... | G06T 19/20 345/419 |
| 2014/0274163 A1* | 9/2014 | Liu | ........................ | G01S 5/0294 455/456.6 |
| 2015/0226570 A1* | 8/2015 | Takei | ................ | G01C 21/3641 701/454 |
| 2016/0031536 A1* | 2/2016 | Kim | ........................ | B63B 45/00 701/21 |
| 2016/0216129 A1* | 7/2016 | Takei | ................ | G01C 21/3667 |
| 2016/0265919 A1* | 9/2016 | Schuller | .................... | G01S 5/16 |
| 2017/0083005 A1* | 3/2017 | Hickman | ............... | A01N 25/10 |
| 2018/0299557 A1* | 10/2018 | Yi | ........................ | G01S 17/89 |
| 2019/0025062 A1* | 1/2019 | Young | ...................... | G01S 19/13 |
| 2019/0035110 A1* | 1/2019 | Shikimachi | ........ | G06K 9/00798 |
| 2019/0126918 A1* | 5/2019 | Takayanagi | ........... | B60W 50/14 |
| 2019/0186927 A1* | 6/2019 | Koponen | ............. | G01C 21/32 |
| 2020/0327179 A1* | 10/2020 | Matsumoto | ......... | G01C 21/3608 |
| 2021/0166459 A1* | 6/2021 | Miller, IV | ............... | G10L 15/14 |

FOREIGN PATENT DOCUMENTS

| | | | | |
|---|---|---|---|---|
| CN | 105373610 A | | 3/2016 | |
| CN | 107544515 A | | 1/2018 | |
| CN | 107907131 | | 4/2018 | |
| CN | 109074084 | | 12/2018 | |
| EP | 0703435 A1 | * | 3/1996 | ............ G01C 21/36 |
| EP | 2034271 A1 | * | 3/2009 | ............ G01S 19/48 |
| GB | 2222897 A | * | 3/1990 | ......... G01C 21/3644 |
| JP | 08014930 A | * | 1/1996 | |

* cited by examiner

METHOD FOR UPDATING A MAP AND MOBILE ROBOT

RELATED APPLICATION

This application is a continuation application of International Patent Application No. PCT/CN2019/086281, filed May 9, 2019, the entire contents of which are hereby incorporated by reference.

TECHNICAL FIELD

The present application relates to the technical field of navigation and control, in particular to a method for updating a map, a server and a mobile robot.

BACKGROUND OF THE INVENTION

An autonomous movement device such as a robot performs navigation and movement operation based on a map, wherein when no map for navigation is available, the autonomous movement device needs to update a map. At present, a map constructed by an autonomous movement device during navigation and movement cannot be saved persistently, since consistency of initial position and initial pose of an autonomous movement device, and physical space in which a navigation and movement operation is performed cannot be achieved each time.

However, as to the autonomous movement device such as a cleaning robot or a patrol robot, it cannot ensure that the navigation and movement operation of the autonomous movement device are in a same movement environment at each time, for example, in the same light environment, in the same physical space in which obstacles are placed in the same positions, therefore, for such type of autonomous movement device, great errors can be caused when the current navigation operation is performed based on a map constructed at the previous time.

SUMMARY OF THE INVENTION

In view of the shortcomings of the prior art, an objective of the present application is to provide a method for updating a map and a mobile robot, so as to solve the problem of non-persistent of the map in the prior art.

In one aspect, the present application provides a method for updating a map, the method comprises: acquiring a current map and a corresponding current location data set constructed when a first movement device performs a navigation and movement operation in a physical space, wherein the first movement device performs the navigation and movement operation based on a reference map and a corresponding reference location data set which are corresponding to the physical space and stored in advance; performing a data fusion process on the reference map and the corresponding reference location data set as well as the current map and the corresponding current location data set; and taking a map and a corresponding location data set after being data fusion processed as a new reference map and a corresponding new reference location data set in the first movement device.

In some embodiments, the reference map and the corresponding reference location data set are constructed when the first movement device and/or at least one second movement device respectively perform(s) at least one navigation and movement operation in the physical space.

In some embodiments, the step of performing a data fusion process on the reference map and the corresponding reference location data set as well as the current map and the corresponding current location data set comprises: determining that first location feature information and corresponding first location coordinate information in the reference location data set are matched with second location feature information and corresponding second location coordinate information in the current location data set; and performing the data fusion process on the reference map and the corresponding reference location data set as well as the current map and the corresponding current location data set based on the matched first location feature information and corresponding first location coordinate information as well as second location feature information and corresponding second location coordinate information.

In some embodiments, the step of determining that first location feature information and corresponding first location coordinate information in the reference location data set are matched with second location feature information and corresponding second location coordinate information in the current location data set comprises: matching each first location feature information in the reference location data set with each second location feature information in the current location data set; and determining the matched first location feature information and corresponding first location coordinate information as well as second location feature information and corresponding second location coordinate information based on the obtained matching results.

In some embodiments, the step of determining the matched first location feature information and corresponding first location coordinate information as well as second location feature information and corresponding second location coordinate information based on the obtained matching results comprises: matching the corresponding first location coordinate information with the corresponding second location coordinate information based on the matched first location feature information and second location feature information, so as to obtain the matched corresponding first location coordinate information and corresponding second location coordinate information.

In some embodiments, the first location feature information contains first measurement location feature information, the first measurement location feature information is determined based on a spatial feature in the reference map, and the second location feature information contains second measurement location feature information, the second measurement location feature information is determined based on a spatial feature in the current map; and/or the first location feature information contains first visual location feature information, the first visual location feature information is extracted from a first keyframe image in the reference location data set; and the second location feature information contains second visual location feature information, the second visual location feature information is extracted from a second keyframe image in the current location data set.

In some embodiments, the first measurement location feature information contains at least one of the followings: measurement data determined based on combination of coordinate information for describing the spatial feature in the reference map, and measurement data determined based on combination of depth information for describing the spatial feature in the reference map; and the second measurement location feature information contains at least one of the followings: measurement data determined based on combination of coordinate information for describing the spatial feature in the current map, and measurement data determined based on combination of depth information for describing the spatial features in the current map.

In some embodiments, the step of matching each first location feature information in the reference location data set with each second location feature information in the current location data set comprises: matching the second location feature information in each second keyframe image in the current location data set with the first location feature information in each first keyframe image in the reference location data set, so as to determine the matched first location feature information in the first keyframe image and second location feature information in the second keyframe image.

In some embodiments, the method further comprises: analyzing the first keyframe image in the reference location data set, determining a first relative orientation relation between a first image coordinate information corresponding to the first keyframe image and a principal direction of the physical space; and adjusting a pixel position of the first location feature information in the first keyframe image based on the first relative orientation relation; and/or analyzing the second keyframe image in the current location data set, determining a second relative orientation relation between a second image coordinate information corresponding to the second keyframe image and the principal direction of the physical space; and adjusting a pixel position of the second location feature information in the second keyframe image based on the second relative orientation relation; so as to match the adjusted second location feature information in the second keyframe image with the adjusted first location feature information in the first keyframe image.

In some embodiments, the method further comprises a step of adjusting the reference map or the current map until the two adjusted maps meet preset overlapping conditions, so as to determine the matched first location feature information and corresponding first location coordinate information in the reference location data set as well as second location feature information and corresponding second location coordinate information in the current location data set.

In some embodiments, the step of performing the data fusion process on the reference map and the corresponding reference location data set as well as the current map and the corresponding current location data set based on the matched first location feature information and corresponding first location coordinate information as well as second location feature information and corresponding second location coordinate information comprises: correcting coordinate error(s) in the reference map and/or the current map based on coordinate deviation information between the matched first location coordinate information and second location coordinate information; performing a merging operation based on the corrected at least one map to obtain a new reference map; and marking at least the matched first location feature information in the reference location data set and second location feature information in the current location data set in the new reference map, so as to obtain new location coordinate information.

In some embodiments, the step of performing the data fusion process on the reference map and the corresponding reference location data set as well as the current map and the corresponding current location data set based on the matched first location feature information and corresponding first location coordinate information as well as second location feature information and corresponding second location coordinate information comprises at least one of the following steps, so as to obtain a new reference location data set: adjusting the reference location data set or the current location data set based on location feature deviation information between the matched first location feature information and second location feature information; and adding each unmatched second location feature information in the current location data set to the reference location data set, or, adding each unmatched first location feature information in the reference location data set to the current location data set.

In some embodiments, the method further comprises the following steps: detecting integrity of the current map, and/or detecting the amount of information in the current location data set; and performing the data fusion process based on the obtained detection results.

In some embodiments, the method further comprises a step of sending the new reference map and the corresponding new reference location data set to the first movement device in the physical space.

In some embodiments, the method further comprises a step of marking a position of at least one second device which is configured with an image acquisition device in the physical space in the new reference map.

In another aspect, the present application provides a mobile robot, the mobile robot comprises: a storage device, configured to store a reference map and a corresponding reference location data set, a current map and a corresponding current location data set, and at least one program; wherein the current map and the corresponding current location data set are constructed when the mobile robot performs a navigation and movement operation; and the reference map and the corresponding reference location data set are used by the mobile robot in performing the navigation and movement operation; a movement device, configured to perform a movement operation based on a navigation route determined based on the reference map; a location sensing device, configured to collect second location feature information during the navigation and movement operation, so as to form the current location data set; and a processing device, connected with the storage device, an image acquisition device and the movement device, and configured to invoke and execute the at least one program, so as to coordinate the storage device, the image acquisition device and the movement device to perform any method for updating a map mentioned above.

In some embodiments, the stored reference map and corresponding reference location data set are constructed when the mobile robot and/or at least one second movement device respectively perform(s) at least one navigation and movement operation in a same physical space.

In some embodiments, the mobile robot further comprises an interface device, configured to perform data communication with at least one second movement device, wherein the processing device further configured to acquire a third map and a corresponding third location data set provided by the second movement device, so as to perform a data fusion process on the reference map and the corresponding reference location data set, the second map and the corresponding second location data set, as well as the third map and the corresponding third location data set.

In yet another aspect, the present application provides a mobile robot, the mobile robot comprises: an interface device, configured to perform data communication with a server; a storage device, configured to store a reference map and a corresponding reference location data set used for providing a navigation service during a navigation and movement operation in a physical space, store a current map and a corresponding current location data set constructed during the navigation and movement operation, and store at least one program; and a processing device, connected with the storage device and the interface device, and configured to invoke and execute the at least one program, so as to coordinate the storage device and the interface device to perform the following steps: sending the current map and the corresponding current location data set to the server; and acquiring a new reference map and a corresponding new reference location data set fed back by the server, and updating the stored reference map and corresponding reference location data set, wherein the acquired new reference map and corresponding new reference location data set are obtained after that the server performs a data fusion process on the reference map and the corresponding reference location data set before being updated, as well as the current map and the corresponding current location data set.

In some embodiments, the new reference map and the corresponding new reference location data set are further data fusion processed with a third map and a corresponding third location data set provided by at least one second movement device.

As mentioned above, the method for updating a map and the mobile robot in the present application have the following beneficial effects: the present application provides a solution for persistence of a map, that is, after a movement device is restarted, the map thereof is in the same coordinate system as the map used in the previous operation. A user can mark the map on a terminal device, thus set an operation area and an operation manner of the movement device. Meanwhile, the map in the present application can cover different scenarios over time, and therefore, the map can provide location information for the movement device in different time periods and different illumination conditions.

DETAILED DESCRIPTION

Figure 1:
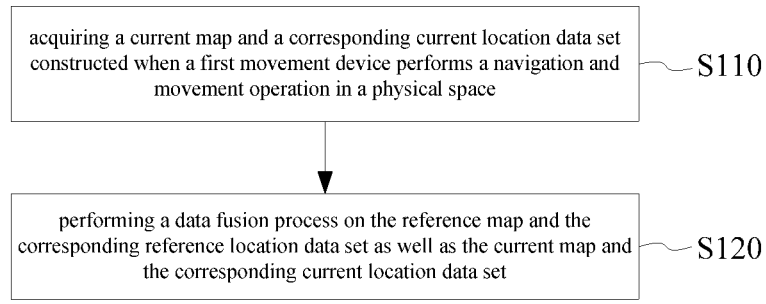
FIG. 1 shows a flow chart of a method for updating a map of the present application in an embodiment.

Implementations of the present application will be described below through specific embodiments, and those skilled in the art can easily understand other advantages and effects of the present application from the contents disclosed in the present specification.

Exceptions of the definition only exist when the combinations of elements, functions, steps or operations are mutually exclusive inherently in some ways. In addition, the terms "first", "second", etc. are used herein to describe various elements in some examples, these elements should not be limited by these terms. These terms are only used to distinguish one element from another.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C".

The autonomous movement device mentioned in the background art are extended to other movable devices which perform navigation operation based on a map, such as a vehicle and a vehicle terminal provided on a vehicle. When a satellite location technology (or other location techniques) cannot be used to locate a movement device in the map data, and other location information needs to be used, a movement device (for example, a mobile robot) cannot acquire corresponding location information and map in the corresponding physical space.

Therefore, the present application provides a method for updating a map and a mobile robot, so as to provide a movement device with a reference map and a corresponding reference location data set which can be used persistently by the movement device during navigation and movement within a physical space, wherein the physical space means a physical space provided for navigation and movement of the movement device, and the physical space includes but is not limited to any of the following: an indoor/outdoor space, road space and flight space. In some embodiments, the movement device is an unmanned aerial vehicle, and the physical space is a flight space correspondingly; in some other embodiments, the movement device is a vehicle with an automatic driving function, and the physical space is a tunnel road which cannot be located or a road space in which network signals are weak but navigation is needed correspondingly; in still some other embodiments, the movement device is a cleaning robot, and the physical space is an indoor or outdoor space correspondingly.

Herein, the reference map and the corresponding reference location data set are constructed when the first movement device and/or at least one second movement device respectively perform(s) at least one navigation and movement operation in the physical space. That is, the reference map and the corresponding reference location data set are fused into a map and a corresponding location data set constructed when at least one movement device performs multiple navigation and movement operations within the same physical space respectively. The reference map and the corresponding reference location data set form the abovementioned map data, wherein the movement device is configured with sensing devices, such as an image acquisition device or a movement sensing device, which provide navigation data for autonomous movement. The movement device includes a first movement device and/or at least one second movement device, wherein the first movement device and the second movement device can be devices with the same type or with different types. For example, in a storage space, the first movement device and the second movement device are both vans with an autonomous navigation function. For another example, in an indoor space, the first movement device is a cleaning robot, while the second movement device is a family companion robot. For still another example, in a tunnel space, the first movement device and the second movement device are both vehicle terminals. The first movement device or the second movement device can also be a patrol robot, etc.

In a method for updating a map and a mobile robot provided in the present application, a map and a location data set constructed during performing operation each time are stored in a storage medium, and are fused with a reference map and a corresponding reference location data set in the storage medium, so that the reference map and the corresponding reference location data set are optimized constantly, thereby enabling the reference map and the corresponding reference location data set to cover more scenarios. Meanwhile, the reference map and the corresponding reference location data set can be used for the first movement device to move autonomously, and for the first movement device to accurately locate its position in different time periods and illumination conditions. In addition, through the updated map data in the present application, the first movement device is located in the same coordinate system during each navigation and movement operation, thereby providing a basis for persistence of a map.

The map constructed by the first movement device during any one of the navigation and movement operation can be of the following type: a grid map, or a topological map. For example, a grid map is constructed during route planning when the first movement device performs navigation and movement operation. For another example, the physical space is represented as a topology structural diagram with nodes and associated connecting lines, wherein the node represents important position point (such as corner, door, elevator, stair) in an environment, and edge represents connecting relation between nodes, such as corridor, etc. On this basis, each type of map is marked with semantic labels, such that a user can control the navigation of the first movement device based on semantics. The semantic labels can be names of objects within the physical space, for example, an office table, a notebook, etc. In some situations, the user sends a voice instruction to the first movement device, for example, a bedroom is 6 meters ahead and can be seen on the right, therefore, the map is also called a semantic map. The navigation and movement operation refers to a process in which the first movement device moves based on navigation data and updates map data. In some other conditions, the first movement device performs subsequent navigation during the navigation and movement operation based on map data which have already been constructed. The first movement device moves to a designated place and works based on the navigation data. For another example, a vehicle in a cruising state performs navigation based on map data on a road such as a tunnel which cannot be located. In still some other situations, the first movement device constructs a map of a working environment during a navigation and movement operation and stores the map on a storage medium, for example, a cleaning robot or a vehicle constructs a map of its working environment while working, and transmits the constructed map to the storage medium. The storage medium can be separated from the first movement device, for example, a storage device configured in a server, or a storage device of an intelligent terminal which is in data communication with the first movement device. The storage medium is for example an SD card, a flash configured at an intelligent terminal, for another example, the storage medium is a solid state disk configured on a server. The storage medium can also be a storage device configured in the first movement device itself, for example, an SD card, a flash or other storage media configured in the first movement device.

Herein, in the present application, taking the current map data constructed when the first movement device performs one navigation operation as an example, that is, the current map data containing the current map and the corresponding current location data set, a process used for updating a reference map and a corresponding reference location data set which provides persistent is described.

When performing the current navigation and movement operation, the first movement device moves autonomously according to a reference map and a corresponding reference location data set, and simultaneously constructs a current map and a corresponding current location data set corresponding to the current navigation and movement operation. For example, on a tunnel road which cannot be located or on a road where network signals are weak but navigation is needed, a vehicle with a cruising function can drive itself autonomously based on a reference map and a corresponding reference location data set through VSLAM (Visual Simultaneous Localization and Mapping) or SLAM (Simultaneous Localization and Mapping); meanwhile, the vehicle constructs a current map and a corresponding current visual data set of a physical space in which the road passed by this time is located according to the travelled route. For another example, when performing a cleaning task, a cleaning robot can move autonomously and clean according to a reference map and a corresponding reference location data set through VSLAM or SLAM, and meanwhile construct a current map and a corresponding current visual data set of a physical space in which the route passed by this time is located according to the cleaned route. For still another example, a navigation robot in a hotel can provide navigation service for a customer after receiving a semantic instruction from the customer according to a reference map and a corresponding reference location data set through VSLAM or SLAM, and construct a current map and a corresponding current visual data set of a physical space in which the route passed by this time is located according to the route passed by.

To facilitate a fusion operation, a current map and a reference map are of the same type, for example, they are both grid maps or both topological maps. Or, the current map and the reference map can be converted into the same type. For example, by means of a pixel data with a preset resolution, a grid map is converted into a topological map, etc. The current map describes geographical information of a physical space detected by the first movement device along the route in one navigation and movement; in other words, the current map is determined based on the position and pose of the first movement device during the movement. The current map contains coordinate information corresponding to an initial position of the first movement device, and coordinate information corresponding to obstacles sensed during a movement period and other geographical information. The reference map describes geographical information fused with the physical space detected by the first movement device and/or at least one second movement device along routes of multiple navigation and movement operations in the same physical space. The reference map contains coordinate information corresponding to an initial position determined based on location matching of the first movement device, and coordinate information corresponding to obstacles in the physical space determined after location matching and other geographical information.

The current location data set contains second location feature information and corresponding second location coordinate information in the current map collected based on current navigation and movement. According to sensing devices which can be provided by the first movement device, in some embodiments, the second location feature information contains second measurement location feature information determined based on spatial features in the current map. In some examples, the first movement device contains a measuring and sensing device, such as a laser distance sensor or an infrared distance sensor, and contains a measuring and sensing device, such as an angle sensor, a displacement sensor or a counter, which is arranged on a movement control system (for example, a drive motor, a roller, etc.) of the first movement device. Based on measurement of a relative position relation of obstacles by the corresponding measuring and sensing device, and in combination with measurement of a movement distance and an angle of the first movement device by the measuring and sensing device of the movement control system, the first movement device extracts second measurement location feature information according to spatial features formed by geographical information corresponding to obstacles in the current map. The spatial feature includes at least one of obstacle contour, feature point and feature line described in the current map. The second measurement location feature includes at least one of the following describing manners: measurement data determined based on a combination of coordinate information corresponding to spatial features in the current map, and measurement data determined according to a combination of depth information used for describing spatial features in the current map. For example, with coordinate information of a measurement point in a contour of an obstacle in the current map as a starting point, a position offset vector of the obstacle contour is constructed to obtain that the second measurement location feature at least includes position offset vectors which are connected in an end-to-end manner. For another example, based on depth information of a measurement point on a contour of an obstacle in the current map measured by the first movement device and other depth information on the contour measured by the first movement device, the second measurement location feature at least includes: depth offset vectors used for describing the contour of the obstacle. For another example, the second measurement location feature can further include depth offset vectors and position offset vectors used for describing the contour of the same obstacle. For still another example, the second measurement location feature information is obtained based on a combination of coordinate information of an inflection point in the current map and coordinate information of surrounding measurement points.

In some other embodiments, the second location feature information contains second visual location feature information extracted from a second keyframe image in the current location data set. The second keyframe image is the keyframe image captured by the first movement device during the navigation and movement operation. The second visual location feature information is obtained from multiple second keyframe images by means of image feature extraction and matching. The second visual location feature information includes but is not limited to: feature point and feature line in the second keyframe image. The second visual location feature information is for example described by a descriptor. For example, based on an SIFT (Scale-invariant feature transform) algorithm, location feature information is extracted from multiple second keyframe images, a grayscale value sequence used to describe the visual location feature information is obtained based on image blocks containing visual location feature information in the multiple second keyframe images, and the grayscale value sequence is seems as a descriptor. For another example, the descriptor is used for describing the second visual location feature information through encoding surrounding brightness information of the visual location feature information. With the second visual location feature information as a center, multiple points are sampled around the second visual location feature information, wherein the number of sampling points is but not limited to 256 or 512, and these sampling points are subjected to pairwise comparison to obtain brightness relation between these sampling points and convert the brightness relation into binary strings or other coded format.

Similar to the second measurement location feature information and the second visual location feature information in the current location data set, the reference location data set contains a set of first location feature information collected and fused based on each movement by a first movement device and/or at least one second movement device during all the previous navigation and movement operations. According to a sensing device provided by the first movement device and/or at least one second movement device, in some embodiments, the first location feature information includes first measurement location feature information determined based on spatial features in a reference map. The first measurement location feature information includes at least one of the following: measurement data determined based on a combination of coordinate information of spatial features in a reference map, and measurement data determined according to a combination of depth information for describing spatial features in a reference map. Herein, the manner of describing spatial features by the first measurement location feature information is the same as or similar to the manner of describing spatial features by the second measurement location feature information, and will not be repeated in detail herein. In still some other embodiments, the first location feature information includes first visual location feature information extracted from a first keyframe image in a reference location data set. The manner of acquiring the first keyframe image is the same as or similar to the manner of acquiring the above second keyframe image, and will not be repeated in detail herein; and the manner of describing location features in an image by the first visual location feature information is the same as or similar to the manner of describing location features in an image by the second visual location feature information, and will not be repeated in detail herein.

It should be noted that a frame refers to a single image with the smallest unit in animation, and a frame is represented as a grid or a marker on a timeline of animation software. A key-frame is equivalent to an original image in two-dimensional animation, and refers to a frame at which a key action of an object in motion or change is shown. A visual sensor can constantly capture surrounding images during the movement of a movement device, wherein images of adjacent frames have higher similarity. Therefore, if adjacent frames are compared, a motion process of a movement device cannot be judged obviously, and thus through comparison of key frames, the motion process of the movement device can be judged more obviously. Therefore, each first keyframe image acquired by a first movement device during navigation and movement operation corresponds to different position and pose of the first movement device in a physical space. By using different first keyframe images captured by the first movement device at different positions and poses, matched location features in the images can be determined, the matched location features are used as first location feature information, and coordinate information of the first location feature information in a current map is further determined. Herein, as to the method of utilizing at least two keyframe images to match location feature information and determine the position and pose at which a first movement device captures each keyframe image, please refer to a patent application with a publication number of CN107907131A, which is incorporated by reference, and will not be described in detail herein In a period when a first movement device performs one navigation and movement operation, the first movement device determines its current position based on a reference map and a corresponding reference location data set and controls the pose, movement direction and speed in order to move along a navigation route. Meanwhile, the first movement device further constructs a current map and a corresponding current location data set based on an initial position of the navigation and movement this time. In some examples, after finishing this navigation and movement, the first movement device stores the current map and the corresponding current location data set, and starts step S110 in a method for updating a map of the present application in due course. For example, the method for updating a map of the present application is performed when the first movement device is charged or when the first movement device is rich in its system resources. In some other examples, in the period when the first movement device performs the navigation and movement this time, the method for updating a map of the present application is performed based on a constructed current map and a corresponding current location data set.

Please refer to FIG. 1 which shows a flow chart of a method for updating a map in one embodiment. In some examples, the method is mainly performed by a server and a first movement device cooperatively. For example, the first movement device provides the stored current map and the corresponding current location data set to a server when the first movement device is charged or when the occupancy rate of the system resource is relatively low, and the server performs step S110 to start construction of a reference map and a corresponding reference location data set. In some other examples, the method is performed by the first movement device itself. For example, the first movement device reads the current map and the corresponding current location data set from the storage medium when the first movement device is charged or when the occupancy rate of the system resource is relatively low so as to perform step S110, and starts construction of a reference map and a corresponding reference location data set.

In Step S110, a server acquires a current map and a corresponding current location data set constructed when a first movement device performs a navigation and movement operation in a physical space, or the first movement device acquires the current map and the corresponding current location data set constructed by the first movement device itself.

Taking a server as an example to describe subsequent steps of the method. It should be noted that the first movement device can also perform subsequent steps.

In step S120, a data fusion process is performed on the reference map and the corresponding reference location data set as well as the current map and the corresponding current location data set.

It should be noted that fusion refers to an integration of current maps and corresponding current location data sets which are constructed at different time. Integration of maps includes any of the following: integrating coordinate information in current maps constructed at different time into unified coordinate information in a reference map; or integrating coordinate information in the current maps into a reference map. In some more specific examples, differential process is performed on the current map and the reference map, so as to obtain differential coordinate information in the current map, and thus correct coordinate information in the reference map based on the differential coordinate information. Integration of the map further includes removal of a geographical position not contained in the reference map recently, for example, removal of coordinate information of geographical positions of obstacles which is determined to be placed temporarily.

Integration of location data sets includes any of the following: integrating second location feature information in current location data sets constructed at different time into a reference location data set which corresponds to the reference map in a unified manner; or integrating second location feature information in the current location data set into a stored reference location data set. In some more specific examples, differential process is performed on matched location feature information in the current location data set and the reference location data set, and corresponding first location information in the reference location data set is updated based on differential location feature information. Integration of the location data set further includes: removal of first location feature information not contained in a reference location data set recently, for example, removal of first location feature information which is determined to reflect obstacles being placed temporarily, and/or adding of second location feature information in the current location data set to the reference location data set, therefore, the fused map and location data set integrate in total all the map data collected by a first movement device and/or a second movement device during navigation and movement operations in history.

For example, a first movement device performs the first navigation and movement operation Do1 under natural light illumination at day time, the current map P1 and the current location feature data set D1 constructed by the first movement device are both in states shown under natural light illumination and are used as a reference map and a corresponding reference location data set; while at night, under indoor light irradiation, both illumination brightness and illumination angles are changed, and the states of the current map P2 and the current location feature data set D2 constructed by the first movement device based on second navigation and movement operation Do2 are changed. Herein, the current map P2 and the current location data set D2 constructed at night by the first movement device and the reference map P1 and the reference location data set D1 constructed at day time are fused, and the fused reference map and the corresponding reference location data set simultaneously contain the maps and the location data sets constructed in scenarios at day time and at night of the physical space.

For another example, the first movement device and/or at least one second movement device have performed multiple navigation and movement operations within a physical space, and the reference map and the corresponding reference location data set have fused with the maps and location data sets constructed during multiple navigation and movement operations. After a new navigation and movement operation of the first movement device and/or at least one second movement device, the constructed current map and the corresponding current location data set are fused with the reference map and the corresponding reference location data set which are constructed in history, and in this way, through constant iteration, the current map and current location data set are constructed.

Figure 2:
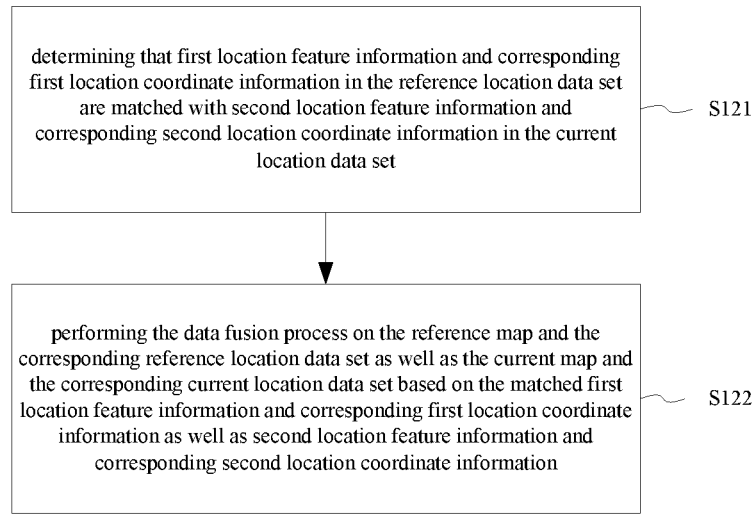
FIG. 2 shows a flow chart of step of performing a data fusion process on the reference map and the corresponding reference location data set as well as the current map and the corresponding current location data set in the present application.

Herein, since second location feature information collected by a first movement device and/or second device during each navigation and movement is not completely consistent with first location feature information in the reference location data set, then location feature information needs to be matched during fusion. Please refer to FIG. 2 which shows a flow chart of step of performing a data fusion process on the reference map and the corresponding reference location data set as well as the current map and the corresponding current location data set in the present application.

The step of performing a data fusion process on the reference map and the corresponding reference location data set as well as the current map and the corresponding current location data set includes: step S121, determining that first location feature information and corresponding first location coordinate information in the reference location data set are matched with second location feature information and corresponding second location coordinate information in the current location data set.

The reference location data set contains first location feature information and corresponding first location coordinate information in a reference map, and the current location data set contains second location feature information and corresponding second location coordinate information in the current map. A server determines that an information combination which contains the first location feature information and the corresponding first location coordinate information is matched with an information combination which contains the second location feature information and the corresponding second location coordinate information.

In some implementations, step S121 includes step S1211: matching each first location feature information in the reference location data set with each second location feature information in the current location data set; and determining the matched first location feature information and corresponding first location coordinate information as well as second location feature information and corresponding second location coordinate information based on the obtained matching results.

Manners of matching location feature information for example include: matching to determine whether at least one of the coordinate vector deviation value or the depth vector deviation value described by measurement location feature information in two data sets is within a preset measurement matching error range; or, matching to determine whether at least one of the grayscale value, grayscale distribution, color value, color distribution, color difference or grayscale step described by the visual location feature information in two data sets is within a preset image matching error range.

In some examples, the server matches first location feature information with second location feature information in a traversing manner. When at least one of the following matching conditions is met, the server determines that the first location coordinate information corresponding to the first location feature information is matched with the second location coordinate information corresponding to the second location feature information based on the matched first location feature information and second location feature information. The matching conditions include: the proportion accounted for by the matched first location feature information in a sum of the first location feature information is greater than a ratio threshold, the proportion accounted for by the matched second location feature information in a sum of the second location feature information is greater than a ratio threshold, or the sum of the matched first location feature information is greater than a sum threshold. The matching conditions include: an evaluation result obtained through evaluating the above matching conditions based on a preset weight satisfies an evaluation threshold interval.

In some other examples, in order to prevent fusion errors occurred during fusion when the first movement device moves within different physical spaces which contain similar location feature information, the server further matches location coordinate information corresponding to each location feature information. For example, when a single mobile robot or different mobile robots clean(s) rooms of different house types but with unified decoration, the obtained second location feature information may have a higher matching degree with the first location feature information in the reference location data set, but corresponding location coordinate information differs greatly.

To this end, when the first location feature information and the second location feature information conform to at least one matching condition in the above examples, the step S1211 further includes: matching the corresponding first location coordinate information with the corresponding second location coordinate information based on the matched first location feature information and second location feature information, so as to obtain the matched corresponding first location coordinate information and corresponding second location coordinate information.

Herein, based on the matched first location feature information and second location feature information, whether a position relation error between the first location coordinate information and second location coordinate information satisfies a preset position relation error condition is determined through statistics, if so, the first location coordinate information corresponding to the first location feature information is determined to be matched with the second location coordinate information corresponding to the second location feature information; otherwise, all the matched first location feature information is determined to be not matched with the second location feature information. The above position relation error conditions for example include at least one of the following and a combination: a displacement error of matched location feature information between location coordinate information in the respective map is smaller than a preset displacement error threshold, an angle error of matched location feature information between location coordinate information in the respective map is smaller than a preset angle error threshold, the proportion accounted for by the amount of location coordinate information conforming to a preset displacement error threshold in the amount of matched location feature information exceeds a preset ratio threshold, and the amount of location coordinate information conforming to a preset displacement error threshold exceeds a preset total threshold.

To reduce the calculated amount, in a period of matching location feature information, a server further determines whether a position relation error between location coordinate information corresponding to matched location feature information satisfies a preset position relation error condition according to position distribution of matched location feature information in the respective map, if so, first location coordinate information corresponding to a first location feature information is determined to be matched with second location coordinate information corresponding to a second location feature information; otherwise, all the matched first location feature information is determined to be not matched with the second location feature information. The position distribution includes but is not limited to at least one of the following: 1) position clustering is performed on the matched location feature information; correspondingly, a server screens, from matched location feature information, that first location feature information and corresponding first location coordinate information as well as second location feature information and corresponding second location coordinate information are matched according to position relation errors between position distribution after clustering in two maps. 2) a shape described in the respective map by respective location coordinate information corresponding to matched location feature information is used as the position distribution; correspondingly, a server screens, from matched location feature information, that first location feature information and corresponding first location coordinate information as well as second location feature information and corresponding second location coordinate information are all matched according to position relation errors among shapes in two maps. In still some other implementations, a server uses location features contained in a keyframe image to match location features. To this end, in some embodiments, the step S121 includes step S1212: matching the second location feature information in each second keyframe image in the current location data set with the first location feature information in each first keyframe image in the reference location data set, so as to determine the matched first location feature information in the first keyframe image and second location feature information in the second keyframe image, and determining the matched first location feature information and corresponding first location coordinate information as well as second location feature information and corresponding second location coordinate information based on the obtained matching results. Wherein, each keyframe image contains visual location feature information.

Herein, with a descriptor which is used to describe location feature information and which is contained in the keyframe image as a matching index, to-be-matched location feature information in respective keyframe images in two databases is extracted, and matched first location feature information and second location feature information in a second keyframe image and a first keyframe image are determined based on a pixel position relation of multiple location feature information contained in to-be-matched two keyframe images in respective keyframe images. For example, a server performs first rough matching on descriptors (or abstracts of descriptors) of multiple location feature information corresponding to a same keyframe image in two databases, and screens a second keyframe image and second location feature information as well as first keyframe image and first location feature information which are to be further matched based on a preset first matching condition, wherein the first matching condition includes but is not limited to: matching proportion in two descriptors is above a preset ratio, or the number of descriptors conforming to matching conditions in two keyframe images is above a preset quantity number. For another example, a server uses similarity conditions of a frequency histogram to perform a first rough matching on keyframe images in two databases, so as to screen second keyframe image and second location feature information as well as respective first keyframe image and first location feature information which are to be further matched.

A server matches a second keyframe image and second location feature information as well as a first keyframe image and first location feature information which are to be further matched one by one based on an image matching technology. The image matching technology includes but is not limited to matching image feature errors between a shape constituted by multiple pieces of first location feature information in a first keyframe image P1 and a shape constituted by multiple pieces of second location feature information in a second keyframe image P2; if the image feature errors conform to preset image feature error conditions, then the corresponding two pieces of location feature information are determined to be matched, otherwise, the corresponding two pieces of location feature information are determined to be not matched. The image feature error condition includes but is not limited to at least one of the following: whether sides and angles of the two shapes conform to such matching conditions as translation, rotation and scale invariance of images; and an error between a descriptor of first location feature information and a descriptor of second location feature information is smaller than a preset error threshold.

In some more specific examples, a server matches first location coordinate information and second location coordinate information corresponding to matched first location feature information and second location feature information. In some other more specific examples, a server, through a coordinate matching method mentioned in each above example, performs matching operations on location coordinate information corresponding to matched location feature information respectively so as to screen matched first location feature information and corresponding first location coordinate information as well as second location feature information and corresponding second location coordinate information.

In some other embodiments, a current map describes geographical information of a physical space detected by a first movement device along a route of one navigation and movement operation. In other words, the current map is determined based on the position and pose of a first movement device during a movement. Therefore, it can be seen that there is an angle difference generated based on the pose of a first movement device between the current map constructed based on navigation and movement of a first movement device and a principal direction of a physical space.

In order to provide a reference map and a corresponding reference location data set which are basically consistent to a principal direction of a physical space while reducing the calculated amount, the step S121 further includes a step S1213, any one or all the location data sets are adjusted based on a principal direction of a physical space, such that a reference map and a corresponding reference location data set after fusion are basically consistent to a principal direction of a physical space; in this way it is convenient for user to distinguish the position of each device in a physical space when multiple devices are interacting with a user.

Herein, the physical space in which a first movement device is located generally has one or two principal directions. In some examples, the principal direction is used for describing a placement direction of divider which forms the physical space, wherein the divider for example include a wall, a window, a screen, etc. For example, the first movement device performs navigation and movement operation indoors, and a principal direction of the physical space contains two intersecting directions determined along a wall body of a room. In some other examples, the principal direction is used for describing a road direction which can allow movement and which is constructed by means of placed dividers within a physical space, wherein the divider is for example marker line, shoulder stone and goods shelf which are arranged along a road. For example, the first movement device performs navigation and movement in a tunnel, and a principal direction of the physical space is a single direction determined along a road constructed based on a tunnel wall body. For another example, the first movement device performs navigation and movement operation in a warehouse, and a principal direction of the physical space is two directions determined along an intersecting road which is constructed based on goods shelves in a warehouse.

To this end, in some examples, the step S1213 includes: analyzing the second keyframe image in the second location feature information in the current location data set, determining a second relative orientation relation between a second coordinate information corresponding to the second keyframe image and the principal direction of the physical space; and adjusting a pixel position of the second location feature information in the second keyframe image based on the second relative orientation relation, so as to match the adjusted second location feature information in the second keyframe image with the adjusted first location feature information in the first keyframe image through performing step S1212, and determine matched first location feature information and corresponding first location coordinate information as well as second location feature information and corresponding second location coordinate information.

Herein, during different navigation and movement operations of a first movement device, there is an angle difference between map constructed at each time and a principal direction of a physical space. In order that two maps with different angle differences can be fused together, in one example, the reference map and the corresponding reference visual data set are constructed based on a principal direction of the physical space. To this end, based on a corresponding relation between a second keyframe image and corresponding second coordinate information, in the current location data set a second relative orientation relation between the second coordinate information and the principal direction of a physical space is determined, and a pixel position of second location feature information in the second keyframe image is adjusted based on the determined second relative orientation relation, and then the above fusion operation is executed by using adjusted second location feature information and matched first location feature information, thereby location feature mis-matching cause by angle difference can be reduced effectively and the calculated amount of fusion can also be reduced.

In some specific examples, a straight-line segment is selected from second location feature information of the second keyframe image, and a second relative orientation relation between a first movement device and divider in a physical space is determined according to recognized feature segments. Herein, a patent application with a publication number of CN109074084A provides a technical solution in which a second relative orientation relation between a first movement device and divider in a physical space is determined according to recognized feature segments, and is incorporated by reference herein in its entirety. The second keyframe image corresponds to images captured during a movement of a robot in the cited document, the first movement device corresponds to a robot in the cited document, and the second relative orientation relation corresponds to a relative position relation in the cited document, and these will not be repeated in detail herein.

After the second relative orientation relation is determined, a pixel position of second location feature information in the second keyframe image is adjusted based on a determined second relative orientation relation. In some more specific examples, corresponding relation between a pixel coordinate in a second keyframe image and a map coordinate constructed by a current map can be default. For example, a principal optic axis of an image acquisition device is basically vertical to a movement plane of a first movement device, a pixel coordinate system which has a uniform angle relation in a map coordinate system can be constructed, and then a pixel position of second location feature information in the second keyframe image is adjusted based on the second relative orientation relation. In some other more specific examples, a corresponding relation between a pixel coordinate in a second keyframe image and a map coordinate constructed by a current map is set based on an inclined angle at which an image acquisition device is arranged on a first movement device and camera parameters, and the corresponding relation can be acquired together with the current location data set, therefore, a pixel position of second location feature information in the second keyframe image is adjusted based on the second relative orientation relation.

In still some other specific examples, a straight line segment is extracted based on first location feature information of the first keyframe image, for example, line connecting processing is performed on multiple pieces of first location feature information through an image expansion algorithm, and a straight line segment is extracted based on preset straightness and/or length features, and then a first relative orientation relation is determined and a pixel position of first location feature information in the first keyframe image is adjusted through the above specific examples.

According to actual adjustment conditions, adjusted second location feature information in a second key frame and first location feature information in a matched first key frame are overlapped, or differ from each other by 180° or ±90°. Compared with the manner of direct matching, the above preprocessing process is beneficial for optimizing an algorithm for matching location feature information and reducing multi-step calculation in a matching process.

In some other examples, similar to the above analysis of a second keyframe image and adjustment of second location feature information, in some conditions, the acquired current map and the corresponding current visual location database are adjusted at a first movement device side, therefore, the present step comprises analyzing the first keyframe image in the first location feature information in the reference location data set, determining a first relative orientation relation between a first coordinate information corresponding to the first keyframe image and a principal direction of the physical space; and adjusting a pixel position of the first location feature information in the first keyframe image based on the first relative orientation relation.

The manner of determining a first relative orientation relation can be the same as or similar to the manner of determining a second relative orientation relation, and will be not repeated in detail herein. The manner of adjusting a pixel position of first location feature information in a first keyframe image can be the same as or similar to the manner of adjusting a pixel position of second location feature information, and will not be repeated in detail herein.

In some other examples, the present step can be combined with the above two examples and comprises: analyzing the first keyframe image in the first location feature information, determining a first relative orientation relation between a first coordinate information corresponding to the first keyframe image and a principal direction of the physical space, analyzing the second keyframe image in the second location feature information in the current location data set, determining a second relative orientation relation between a second coordinate information corresponding to the second keyframe image and the principal direction of the physical space, and adjusting a pixel position of the first location feature information in the first keyframe image based on the first relative orientation relation, and adjusting a pixel position of the second location feature information in the second keyframe image based on the second relative orientation relation, thereby obtaining a pixel position of each location feature in each keyframe image based on a principal direction of a physical space.

The above step S1212 is performed based on the adjusted first location feature information and/or second location feature information, so as to obtain matched first location feature information and corresponding first location coordinate information as well as second location feature information and corresponding second location coordinate information.

Based on matching results obtained in each of the above examples, the server performs step S122.

In step S122, the data fusion process is performed on the reference map and the corresponding reference location data set as well as the current map and the corresponding current location data set based on the matched first location feature information and corresponding first location coordinate information as well as second location feature information and corresponding second location coordinate information. By means of matched first location feature information and corresponding first location coordinate information as well as second location feature information and corresponding second location coordinate information, a server obtains displacement and angle deviations in the current map and reference map, and feature deviations of location feature information which is at least matched in the current location data set and the reference location data set, and fuses the reference map and corresponding reference location data set as well as the current map and the corresponding current location data set based on the obtained deviation information.

In some examples, the step S122 includes step S1221, the step S1221 comprises correcting coordinate error(s) in the reference map and/or the current map based on coordinate deviation information between the matched first location coordinate information and second location coordinate information.

Herein, a server calculates displacement deviation information and angle deviation information between matched first location coordinate information and second location coordinate information, so as to obtain average displacement deviation information and average angle deviation information, and corrects coordinate information in the reference map and/or the current map according to the obtained average displacement deviation information and average angle deviation information.

The step S122 further includes a step S1222, comprises performing a merging operation based on the corrected at least one map to obtain a new reference map.

In some specific examples, a server takes the corrected map as a new reference map. In some other specific examples, a server determines an overlapping region between the corrected reference map and a current map before (or after) correction, and updates the reference map based on the overlapping region, to obtain a new reference map. For example, a server overlaps the corrected reference map and the corrected current map, to determine an overlapping region between the two maps, and updates the region which is not overlapped in the corrected reference map according to the corrected current map, to obtain a new reference map.

The step S122 further includes a step S1223, comprises marking at least the matched first location feature information in the reference location data set and second location feature information in the current location data set in the new reference map, so as to obtain new location coordinate information.

Herein, a server corrects location coordinate information corresponding to location feature information through a correction operation on each coordinate information in the map and marks the corrected information in a new reference map. For example, location coordinates corresponding to all the location feature information in a reference location data set and/or the current location data set are corrected according to the average displacement deviation information and average angle deviation information mentioned above, to obtain new location coordinate information. For another example, according to displacement deviation information and angle deviation information between matched first location coordinate information and second location coordinate information, first location coordinate information or second location coordinate information is corrected, so as to mark the corrected information in a new reference map.

The step S122 further includes a step of performing the data fusion process on two location data sets to obtain a new reference location data set, and the step at least includes the following step S1224 and/or step S1225.

The step S1224 comprises adjusting the reference location data set or the current location data set based on location feature deviation information between the matched first location feature information and second location feature information.

In some examples, matched first location feature information and second location feature information are measurement location feature information, and a server adjusts corresponding first location feature information or second location feature information in a reference location data set or a current location data set according to vector deviation information between matched first location feature information and second location feature information, to obtain new first feature information in a new reference location data set. For example, matched first location feature information and second location feature information are both measurement location feature information, and are described through multiple position deviation vectors which are connected in an end-to-end manner, and corresponding first location feature information or second location feature information is adjusted by utilizing vector deviation information (containing displacement deviation information and angle deviation information) between the first location feature information and the second location feature information.

In some examples, matched first location feature information and second location feature information are visual location feature information, a server adjusts corresponding first location feature information or second location feature information in a reference location data set or a current location data set according to feature deviation information between matched first location feature information and second location feature information, to obtain new first feature information in a new reference location data set. For example, matched first location feature information and second location feature information are both visual location feature information, and are described by descriptors, and corresponding first location feature information or second location feature information is adjusted by utilizing feature deviation information (containing grayscale deviation information and/or brightness deviation information) between the first location feature information and second location feature information.

The step S1225 comprises adding each unmatched second location feature information in the current location data set to the reference location data set, or, adding each unmatched first location feature information in the reference location data set to the current location data set.

Herein, through performing any adding operation, a server supplements location feature information which is not matched in two location data sets, such that a new reference data set can provide richer location feature information.

Based on the above fusion operation, a first movement device can perform a next navigation operation according to a new reference map and a new reference location data set.

In some other implementations, a current map and a corresponding current location data set provided by the first movement device are not constructed based on the used reference map and the corresponding reference location data set, and thus the method for updating a map further includes:
a step of adjusting the reference map or the current map until the two adjusted maps meet preset overlapping conditions, so as to determine the matched first location feature information and corresponding first location coordinate information in the reference location data set as well as second location feature information and corresponding second location coordinate information in the current location data set.

The overlapping condition includes but is not limited to: a global or edge coordinate error between coordinate information representing obstacle positions in an adjusted reference map and a current map is smaller than a preset coordinate error value, or a global or edge pixel error between image data of two maps formed by the adjusted reference map and the current map is smaller than a preset pixel error value.

Herein, the manner of adjusting a reference map or a current map can be adjusted step by step based on a preset unit angle and unit displacement, and/or performing corresponding translation and rotation operations through calculating displacement and angle difference between matched measurement location feature information in two maps. After the overlapping condition is met, adjusted displacement and angle are determined, image coordinate information in a keyframe image and first location coordinate information in a reference location data set are correspondingly adjusted. On this basis, the above matching and fusion operations are performed, and will not be repeated in detail herein. In some other implementations, part of location feature information may be the same in different physical spaces. In order to prevent a first movement device from recognizing two different physical spaces with location feature information which is partially the same as a same physical space, in some examples, a server can determine whether the physical spaces are the same physical space through matching boundary information of a map.

In still some other examples, the method for updating a map further includes steps of detecting integrity of the current map, and/or detecting the amount of information in the current location data set, and performing the data fusion process based on the obtained detection results.

The manner of detecting integrity of a current map includes: detecting time duration spent in drawing a current map based on a preset time duration condition, so as to determine integrity of the current map; detecting contour data in the current map based on a preset contour condition, to determine integrity of the current map; and detecting integrity of the current map based on an overlapping condition between the current map and the reference map.

The manner of detecting the amount of information in the current location data set includes: detecting total amount of different second location feature information in a location data set based on a preset total amount condition; and/or detecting the amount of second location feature information which is not matched in the current location data set and the reference location data set based on a preset difference total amount condition.

Herein, each of the detection manners is not set alternatively, and detection can be performed by selecting one or more detection manners according to actual conditions, thereby reducing unnecessary fusion operation.

In some examples, a complete navigation and movement operation is not performed each time by the first movement device within the physical space, for example, in a family environment, if a user goes outside when a cleaning robot is working, the cleaning robot needs to stop its current operation. Under this condition, whether a current map and a corresponding current location data set need to be fused with a reference map and a corresponding reference location data set is determined through detecting integrity of the current map, or detecting information amount of a current location data set, or detecting both integrity of the current map and information amount of the current location data set.

In some other examples, the time spent in performing a current navigation and movement operation by a first movement device can be acquired, and the time can be compared with the time spent in performing navigation and movement operation within the physical space by the first movement device historically, so as to determine whether fusion is needed to be performed based on preset conditions. The preset conditions can be a ratio of the time spent in performing a current navigation and movement operation by a first movement device to the time spent in performing a navigation and movement operation task by the first movement device historically within the physical space.

In some other examples, through acquiring operating data of a motor when a first movement device performs current navigation and movement operation, and comparing the operating data with motor data when the first movement device performs navigation and movement operations historically within the physical space, whether fusion is needed to be performed can be determined based on preset conditions. The preset conditions can be a ratio of motor data when a first movement device performs a current navigation and movement operation to motor data when the first movement device performs navigation and movement operation historically within the physical space.

In still some other examples, whether fusion is needed to be determined can be determined based on preset conditions through acquiring moved distance of a first movement device when the first movement device performs a current navigation and movement operation, and comparing the above moved distance with moved distance of the first movement device when the first movement device performs a navigation and movement operation historically within the physical space. The preset conditions can be a ratio of moved distance of a first movement device when the first movement device performs a current navigation and movement operation to a moved distance of the first movement device when the first movement device performs a navigation and movement operation historically within the physical space.

After a fusion operation is performed by utilizing any of the above examples, a map and a corresponding location data set after being data fusion processed are taken as a new reference map and a corresponding reference location data set of the first movement device. Herein, a fused map and corresponding location data set are stored in a storage medium. The reference map and the corresponding reference location data set can be actively pushed to the first movement device, and can also be downloaded based on a request from a first movement device.

In some examples, after performing the fusion operation, a server sends the new reference map and the corresponding reference location data set to a first movement device in the physical space, such that the first movement device can use the new reference map and the corresponding reference location data set when performing a next navigation and movement operation.

In some other examples, a server further performs a step of marking position of at least one second device configured with an image acquisition device within the physical space on the reference map.

Herein, in addition to the first movement device which can perform navigation and movement operation, in the physical space, there is also a second device configured with an image acquisition device. The second device includes a second movement device mentioned above, and/or an electronic device which is fixedly installed within the physical space and configured with an image acquisition device, for example, a security camera, etc. The server further acquires a third keyframe image captured by the second device, determines coordinate position of the second device in a reference map through matching third location feature information in a third keyframe image with first location feature information in a first keyframe image in a reference location data set, marks position of the second device in the reference map, and sends a reference map marked with position of the second device and reference location data set to the first movement device.

In this way, in some specific examples, a user can interact with a first movement device and/or a second device marked with a reference map by means of an intelligent terminal. For example, after a user send an instruction to a second device which is configured to an image acquisition device through the terminal, the second device can execute the instruction of a user based on a reference map and a corresponding reference location data set. A first movement device interacts with a corresponding second device based on the used reference map. For example, a user directly makes a gesture instruction to a camera of the first movement device, the first movement device is in communication with the second device, such that the second device executes the instruction of a user based on the gesture instruction and a reference map and a corresponding reference location data set.

In conclusion, a map constructed in the present application is a persistent map, that is, after a movement device is restarted, the map thereof is in the same coordinate system as the map used in the previous operation. In this way, a user can mark the map on a terminal device, to set a working region and a working manner of a movement device. For example, a user marks, on a terminal device, a region which needs to be worked for multiple times every day or a region which is forbidden from entering or a region which is designated to work in the map. Moreover, since visual information of a same physical space differs greatly in different time periods, the present application not only acquires one operation record, but also continuously collects information and fuses information, so as to enrich location features. With the accumulation of time, after working for multiple times, a map can be enabled to provide location for a movement device in different time periods and illumination conditions. In addition, through a map construction manner disclosed in the present application, a more stable map can be obtained, thereby facilitating interaction between a user and a device, saving computing resources, and solving the problem of computing resource shortage caused by the manner of locating while constructing a map in the prior art. The persistent map in the present application can be directly used after successful location, multiple location features need to be created per second originally, but in the method for updating a map of the present application, only location features which are not covered by a reference map and a corresponding reference location data set need to be created.

The present application further provides a server. Please refer to FIG. 3 which is a structural schematic diagram of a server of the present application in an embodiment. As shown in the figure, a reference map and a corresponding reference location data set as well as a current map and a corresponding current location data set constructed by the first movement device during a navigation and movement operation are stored in a server. The server includes but is not limited to a single server, a server cluster, a distributed server cluster, a cloud server, etc. Herein, according to actual designs, the server is provided by a cloud server provided by a cloud provider. The cloud server includes a public cloud server and a private cloud server, wherein the public or private cloud server includes Software-as-a-Service (SaaS), Platform-as-a-Service (PaaS) and Infrastructure-as-a-Service (IaaS), etc. The private cloud server is for example an Ali cloud computing service platform, an Amazon cloud computing service platform, a Baidu cloud computing platform and a Tencent cloud computing platform, etc.

The server is in data communication with the first movement device in a physical space, wherein the physical space means a physical space provided for navigation and movement of the movement device, and the physical space includes but is not limited to any of the following: an indoor/outdoor space, road space and flight space. In some embodiments, the movement device is an unmanned aerial vehicle, and the physical space is a flight space correspondingly; in some other embodiments, the movement device is a vehicle with an automatic driving function, and the physical space is a tunnel road which cannot be located or a road space in which network signals are weak but navigation is needed correspondingly; in still some other embodiments, the movement device is a cleaning robot, and the physical space is an indoor or outdoor space correspondingly. The movement device is configured with sensing devices, such as an image acquisition device or a movement sensing device, which provide navigation data for autonomous movement. The movement device includes a first movement device and/or at least one second movement device, wherein the first movement device and the second movement device can be devices with the same type or with different types. For example, in a storage space, the first movement device and the second movement device are both vans with an autonomous navigation function. For another example, in an indoor space, the first movement device is a cleaning robot, while the second movement device is a family companion robot. For still another example, in a tunnel space, the first movement device and the second movement device are both vehicle terminals. The first movement device or the second movement device can also be a patrol robot, etc.

Figure 3:
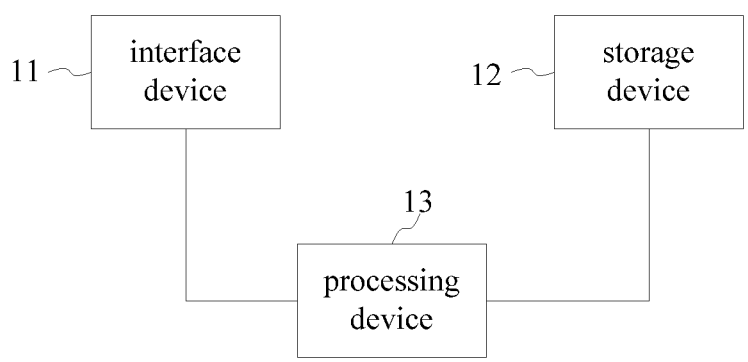
FIG. 3 shows a structural schematic diagram of a server of the present application in an embodiment.

Please further refer to FIG. 3. The server includes an interface device 11, a storage device 12 and a processing device 13. The storage device 12 includes a nonvolatile memory, a storage server, etc. The nonvolatile memory is for example a solid-state disk or a USB flash disk. The storage server is configured to store acquired various power use related information and power supply related information. The interface device 11 includes a network interface, and a data line interface, etc. The network interface includes but is not limited to an Ethernet network interface device, a network interface device based on a mobile network (3G, 4G, 5G, etc.), and a network interface device based on near field communication (WiFi, bluetooth, etc.). The data line interface includes but is not limited to: a USB interface, an RS232, etc. The interface device is in data communication with the control system, a third-party system and an internet, etc. The processing device 13 is connected with an interface device 11 and a storage device 12, and includes at least one of a CPU or a CPU-integrated chip, a field programmable gate array (FPGA) and a multi-core processor. The processing device 13 further includes an memory, a register or other storage for storing data temporarily.

The interface device 11 is configured to perform data communication with a first movement device in a physical space. Herein, the interface device 11 is for example an Ethernet network interface device, a network interface device based on a mobile network (3G, 4G, 5G, etc.), a network interface device based on near field communication (WiFi, bluetooth, etc.), and thereby is in communication connection with a first movement device.

The storage device 12 is configured to store a reference map and a corresponding reference location data set which are provided to the first movement device, store a current map and a corresponding current location data set constructed when the first movement device performs a navigation and movement operation within the physical space, and store at least one program. Herein, the storage device 12 for example includes a hard disk set on a server and used to store at least one program. A server stores a reference map and a corresponding reference location data set in a storage device 12, and when the reference map and the corresponding reference location data set need to be used, the storage device 12 provides the reference map and the corresponding reference location data set to the interface device 11, and at the same time, the storage device 12 stores a current map and a corresponding current location data set from the interface device 11. When a reference map and a corresponding reference location data set need to be fused with a current map and a corresponding current location data set, the storage device 12 provides the reference map and the corresponding reference location data set as well as the current map and the corresponding current location data set to a processing device 13.

The processing device 13 is configured to invoke the at least one program to coordinate the interface device and the storage device to perform a method for updating a map mentioned in any of the above examples. The method for updating a map is as shown in FIG. 1 and related descriptions thereof, and will not be repeated herein.

Figure 4:
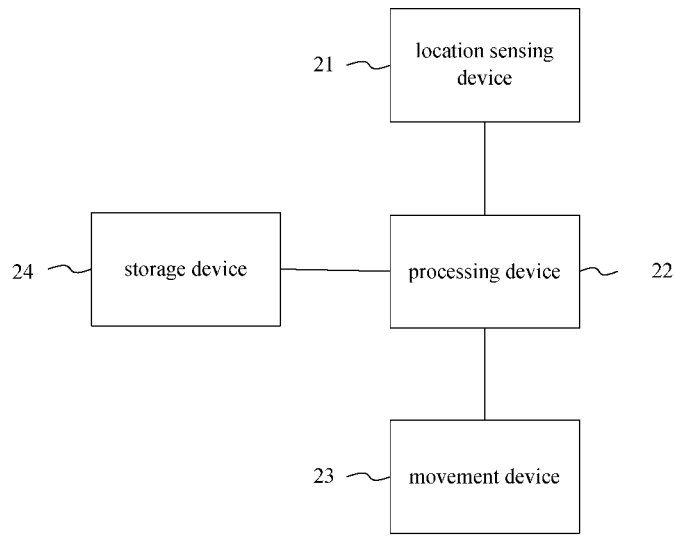
FIG. 4 shows a structure schematic diagram of a mobile robot of the present application in an embodiment.

In some conditions, the steps of updating a map can also be performed by a mobile robot. Herein, a mobile robot is provided. Please refer to FIG. 4 which shows structure schematic diagram of a mobile robot of the present application in an embodiment. As shown in the figure, the mobile robot 2 includes a storage device 24, a movement device 23, a location sensing device 21 and a processing device 22.

The storage device is configured to store a reference map and a corresponding reference location data set for describing a physical space, a current map and a corresponding current location data set constructed during the navigation and movement operation in the physical space, and at least one program; the mobile device performs a moving operation based on a navigation route determined based on the reference map; the location sensing device is configured to collect second location feature information during a navigation and movement operation to constitute a current location data set; the processing device is connected with the storage device, the camera device, and the movement device and is configured to invoke and execute the at least one program to coordinate the storage device, the camera device, and the movement device. The location sensing device includes, but is not limited to, at least one of the following: an imaging acquisition device, an infrared ranging device, a laser ranging device, an angle sensor, a displacement sensor, a counter, and the like. The measurement sensing device such as a laser ranging sensor and an infrared ranging sensor is disposed on the side of the mobile robot body. A measuring sensor such as an angle sensor, a displacement sensor, a counter, or the like is disposed on a mobile control system (such as a driving motor, a roller, etc.) of the mobile robot. A visual sensing device such as a 2D imaging device or a 3D imaging device is disposed on the body side or the top of the mobile robot.

For example, when a mobile robot performs a navigation and movement operation in a physical space, the processing device 22 navigates the movement device 23 based on a reference map and a corresponding reference location data set, and captures a keyframe image through an image acquisition device in the location sensing device 21 and provides the image to the processing device 22, and the processing device 22 constructs a current map and a corresponding current location data set based on the keyframe image provided by the image acquisition device and provides them to the storage device 24 for storage. When a mobile robot is charged or when an occupancy rate of system resources is relatively low, the processing device 22 reads the current map and the corresponding current location data set from the storage device 24, and starts construction of a reference map and a corresponding reference location data set.

Herein, the stored reference map and corresponding reference location data set are constructed based on at least one navigation and movement operation respectively performed by the mobile robot itself and/or at least one second movement device within the physical space, that is, the reference map and the corresponding reference location data set are obtained after fusing a map and a corresponding location data set respectively which is constructed by at least one movement device when performing multiple navigation and movement operations in the same physical space. The reference map and the corresponding reference location data set form the abovementioned map data, wherein the movement device is configured with sensing devices, such as an image acquisition device or a movement sensing device, which provide navigation data for autonomous movement. The movement device includes a mobile robot and/or at least one second movement device, wherein the mobile robot and the second movement device can be devices with the same type or with different types. For example, in a storage space, the mobile robot and the second movement device are both vans with an autonomous navigation function. For another example, in an indoor space, the mobile robot is a cleaning robot, while the second movement device is a family companion robot. For still another example, in a tunnel space, the mobile robot and the second movement device are both vehicle terminals. The mobile robot or the second movement device can also be a patrol robot, etc.

In one exemplary embodiment, the mobile robot further includes an interface device which is configured to perform data communication with at least one second movement device. In some embodiments, the processing device further performs an operation of acquiring a third map and a corresponding third location data set provided by the second movement device, such that data fusion processing can be performed on the reference map and the corresponding reference location data set, the second map and the corresponding second location data set, and the third map and the corresponding third location data set. For example, there are a mobile robot and a second movement device in one physical space, the mobile robot constructs a current map and a corresponding current location data set in a navigation and movement operation process, the second movement device constructs a third map and a corresponding third location data set in a navigation and movement operation process, the mobile robot receives data from the second movement device through an interface device, and performs data fusion processing on a reference map and the corresponding reference location data set, the current map and the corresponding current location data set, and the third map and the corresponding third location data set. In some situations, in the physical space, there are multiple second movement devices in addition to the mobile robot, therefore, multiple third maps and corresponding third location data sets are constructed in a process in which multiple second movement devices perform navigation and movement operations, the mobile robot receives the multiple third maps and corresponding third location data sets through an interface device, and performs data fusion processing on the multiple third maps and corresponding third location data sets as well as a reference map and a corresponding reference location data set and a second map and a corresponding second location data set.

Figure 5:
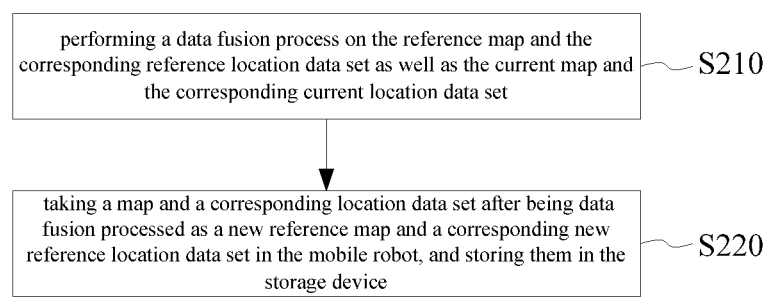
FIG. 5 shows an operation flow chart of a mobile robot in the present application in an embodiment.

In one exemplary embodiment, please refer to FIG. 5 which shows an operation flow chart of a mobile robot in the present application in an embodiment. As shown in the figure, in step S210, the robot performs a data fusion process on the reference map and the corresponding reference location data set as well as the current map and the corresponding current location data set.

It should be noted that fusion refers to an integration of maps and corresponding location data sets which are constructed at different time. Integration of maps includes any of the following: integrating coordinate information in current maps constructed at different time into unified coordinate information in a reference map; or integrating coordinate information in the current maps into a reference map. In some more specific examples, differential process is performed on the current map and the reference map, so as to obtain differential coordinate information in the current map, and thus integrates them into the reference map. Integration of the map further includes removal of a geographical position not contained in the reference map recently, for example, removal of coordinate information of geographical positions of obstacles which is determined to be placed temporarily.

Integration of location data sets includes any of the following: integrating second location feature information in current location data sets constructed at different time into a first location feature information in the reference map in a unified manner; or integrating second location feature information in the second location data set into a reference location data set. In some more specific examples, differential process is performed on the current location data set and the reference location data set to obtain differential location feature information, and two location data sets are integrated based on differential location feature information. Integration of the location data set further includes: removal of first location feature information not contained in a reference location data set recently, for example, removal of first location feature information which is determined to reflect obstacles being placed temporarily, therefore, the fused map and location data set integrate in total all the map data collected by a mobile robot and/or a second movement device during navigation and movement operations in history.

For example, a mobile robot performs the first navigation and movement operation Do1 under natural light illumination at day time, the current map P1 and the current location feature data set D1 constructed by the mobile robot are both in states shown under natural light illumination and are used as a reference map and a corresponding reference location data set; while at night, under indoor light irradiation, both illumination brightness and illumination angles are changed, and the states of the current map P2 and the current location feature data set D2 constructed by the mobile robot based on second navigation and movement operation Do2 are changed. Herein, the current map P2 and the current location data set D2 constructed at night by the mobile robot and the reference map P1 and the reference location data set D1 constructed at day time are fused, and the fused reference map and the corresponding reference location data set simultaneously contain the maps and the location data sets constructed in scenarios at day time and at night of the physical space.

For another example, the mobile robot and/or at least one second movement device have performed multiple navigation and movement operations within a physical space, and the reference map and the corresponding reference location data set have fused with the maps and location data sets constructed during multiple navigation and movement operations. After a new navigation and movement operation of the mobile robot and/or at least one second movement device, the constructed current map and the corresponding current location data set are fused with the reference map and the corresponding reference location data set which are constructed in history, and in this way, through constant iteration, the current map and current location data set are constructed.

Here, the process of the mobile robot performing step S210 is the same as or similar to the process of the first device performing step S120 in the foregoing example, and will not be described in detail herein.

After the fusion operation is performed through any of the above examples, the mobile robot performs step S220, comprises taking a map and a corresponding location data set after being data fusion processed as a new reference map and a corresponding new reference location data set in the mobile robot, and storing them in the storage device.

In some examples, after the mobile robot takes the map and the corresponding location data set after being data fusion as a new reference map and corresponding reference location data set in the mobile robot and stores in the storage device, the new baseline map and corresponding reference location data set are sent to a second mobile device located in the physical space. Here, after the reference map and corresponding reference location data set as well as the second map and the corresponding second location data set are fused, the processing device of the mobile robot sends the new reference map and corresponding reference location data set after being fused to the second movement device, such that the new reference map and corresponding reference location data set can be used for the next navigation and movement operation.

In some other examples, a processing device further performs a step of marking position of at least one second device configured with an image acquisition device within the physical space on the map.

Herein, in addition to the mobile robot which can perform navigation and movement operation, in the physical space, there is also a second device configured with an image acquisition device. The second device includes a second movement device mentioned above, and/or an electronic device which is fixedly installed within the physical space and configured with an image acquisition device, for example, a security camera, etc. The mobile robot further acquires a third keyframe image captured by the second device, determines coordinate position of the second device in a reference map through matching third location feature information in a third keyframe image with first location feature information in a first keyframe image in a reference location data set, marks position of the second device in the reference map, and sends a reference map marked with position of the second device and reference location data set to the storage device of the mobile robot.

In this way, in some specific examples, a user can interact with a mobile robot and/or a second device marked with a reference map by means of an intelligent terminal. For example, after a user send an instruction to a second device which is configured to an image acquisition device through the terminal, the second device can execute the instruction of a user based on a reference map and a corresponding reference location data set. A mobile robot interacts with a corresponding second device based on the used reference map. For example, a user directly makes a gesture instruction to a camera of the mobile robot, the mobile robot is in communication with the second device, such that the second device executes the instruction of a user based on the gesture instruction and a reference map and a corresponding reference location data set.

In conclusion, a map constructed in mobile robot of the present application is a persistent map, that is, after a mobile robot is restarted, the map thereof is in the same coordinate system as the map used in the previous operation. In this way, a user can mark the map on a terminal device, to set a working region and a working manner of a movement device. For example, a user marks, on a terminal device, a region which needs to be worked for multiple times every day or a region which is forbidden from entering or a region which is designated to work in the map. Moreover, since visual information of a same physical space differs greatly in different time periods, the present application not only acquires one operation record, but also continuously collects information and fuses information, so as to enrich location features. With the accumulation of time, after working for multiple times, a map can be enabled to provide location for a movement device in different time periods and illumination conditions. In addition, in the mobile robot disclosed in the present application, a more stable map can be obtained, thereby facilitating interaction between a user and a device, saving computing resources, and solving the problem of computing resource shortage caused by the manner of locating while constructing a map in the prior art. The persistent map in the present application can be directly used after successful location, multiple location features need to be created per second originally, but in the mobile robot of the present application, only location features which are not covered by a reference map and a corresponding reference location data set need to be created.

Figure 6:
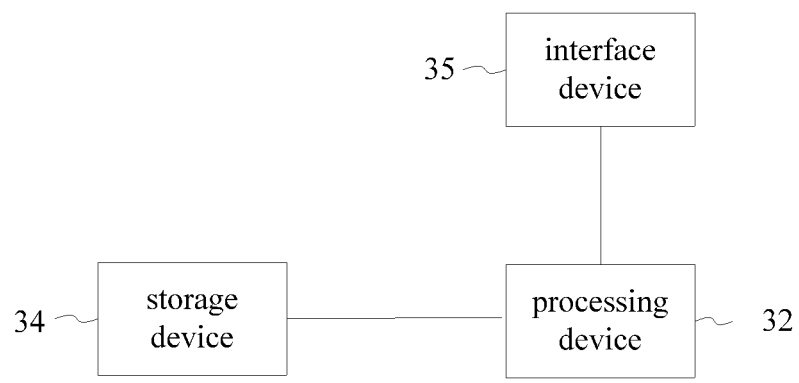
FIG. 6 shows a schematic diagram of a mobile robot in the present application in another embodiment.

According to the technical solution mentioned in the present application, the present application further provides a mobile robot. Please refer to FIG. 6 which shows a schematic diagram of a mobile robot in the present application in another embodiment. As shown in the figure, the mobile robot 3 includes: an interface device 35 configured to perform data communication with a server; a storage device 34 configured to store a reference map and reference location data set used for providing a navigation service during a navigation and movement operation period within a physical space, store a current map and the corresponding current location data set constructed during the navigation and movement operation, and store at least one program; a processing device 32 which is connected with the storage device and the interface device, and configured to invoke and perform the at least one program, so as to coordinate the storage device and the interface device to perform the following method: sending the current map and the corresponding current location data set to the server; and acquiring a new reference map and a corresponding new reference location data set fed back by the server, and updating the stored reference map and corresponding reference location data set, wherein the acquired new reference map and corresponding new reference location data set are obtained after that the server performs a data fusion process on the reference map and the corresponding reference location data set before being updated, as well as the current map and the corresponding current location data set. Herein, the mobile robot 3 performs a navigation and movement operation through using a reference map and a corresponding reference location data set in a storage device 34, and constructs a current map and a corresponding current location data set during the navigation and movement operation. The mobile robot stores the current map and the corresponding current location data set constructed during the navigation and movement operation in the storage device 34. A processing device 32 of the mobile robot 3 uses the current map and the corresponding current location data set in the storage device, and sends the current map and the corresponding current location data set to a server via an interface device 35. After a step of fusing the reference map and the corresponding reference location data set as well as the current map and the corresponding current location data set is performed at a server side, a new reference map and a corresponding reference location data set are formed. The server sends the new reference map and the corresponding reference location data set to an interface device 35 of the mobile robot 3, and stores the new reference map and the corresponding reference location data set in a storage device 34 through a processing device 32.

The manner of updating a reference map and a corresponding reference location data set through data fusion by the server is the same as or similar to the above method example of updating a map, and will not be repeated in detail herein.

In one exemplary embodiment, there are a mobile robot and at least one second movement device in a physical space, and the at least one second movement device construct a third map and a corresponding third location data set during a navigation and movement operation in a physical space. Herein, the new reference map and the corresponding reference location data set are further fused with a third map and a corresponding third location data set provided by at least one second movement device.

A mobile robot disclosed in the present application can construct a persistent map together with a server, and the persistent map can enable a mobile robot to be in a same coordinate system in a map after restarting with in the map of previous work. In this way, a user can mark the map on a terminal device, to set a working region and a working manner of a movement device. For example, a user marks, on a terminal device, a region which needs to be worked for multiple times every day or a region which is forbidden from entering or a region which is designated to work in the map. Moreover, since visual information of a same physical space differs greatly in different time periods, the mobile robot in the present application not only acquires one operation record, but also continuously collects information and fuses information, so as to enrich location features. With the accumulation of time, after working for multiple times, a map can be enabled to provide location for a movement device in different time periods and illumination conditions. In addition, through the mobile robot disclosed in the present application, a more stable map can be obtained, thereby facilitating interaction between a user and a device, saving computing resources, and solving the problem of computing resource shortage caused by the manner of locating while constructing a map in the prior art. The persistent map in the present application can be directly used after successful location, multiple location features need to be created per second originally, but in the mobile robot of the present application, only location features which are not covered by a reference map and a corresponding reference location data set need to be created.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for updating a map, comprising:
    acquiring a current map and a corresponding current location data set constructed when a first movement device performs a navigation and movement operation in a physical space, wherein the first movement device performs the navigation and movement operation based on a reference map and a corresponding reference location data set which are corresponding to the physical space and stored in advance;
    detecting integrity of the current map, and/or detecting the amount of information in the current location data set;
    performing a data fusion process on the reference map and the corresponding reference location data set as well as the current map and the corresponding current location data set based on the obtained detection results; and
    taking a map and a corresponding location data set after being data fusion processed as a new reference map and a corresponding new reference location data set in the first movement device.

2. The method for updating a map of claim 1, wherein the reference map and the corresponding reference location data set are constructed when the first movement device and/or at least one second movement device respectively perform(s) at least one navigation and movement operation in the physical space.

3. The method for updating a map of claim 1, wherein the step of performing a data fusion process on the reference map and the corresponding reference location data set as well as the current map and the corresponding current location data set comprises:
    determining that first location feature information and corresponding first location coordinate information in the reference location data set are matched with second location feature information and corresponding second location coordinate information in the current location data set; and
    performing the data fusion process on the reference map and the corresponding reference location data set as well as the current map and the corresponding current location data set based on the matched first location feature information and corresponding first location coordinate information as well as second location feature information and corresponding second location coordinate information.

4. The method for updating a map of claim 3, wherein the step of determining that first location feature information and corresponding first location coordinate information in the reference location data set are matched with second location feature information and corresponding second location coordinate information in the current location data set comprises:
    matching each first location feature information in the reference location data set with each second location feature information in the current location data set; and
    determining the matched first location feature information and corresponding first location coordinate information as well as second location feature information and corresponding second location coordinate information based on the obtained matching results.

5. The method for updating a map of claim 4, wherein the step of determining the matched first location feature information and corresponding first location coordinate information as well as second location feature information and corresponding second location coordinate information based on the obtained matching results comprises:
    matching the corresponding first location coordinate information with the corresponding second location coordinate information based on the matched first location feature information and second location feature information, so as to obtain the matched corresponding first location coordinate information and corresponding second location coordinate information.

6. The method for updating a map of claim 4, wherein the first location feature information contains first measurement location feature information, the first measurement location feature information is determined based on a spatial feature in the reference map, and the second location feature information contains second measurement location feature information, the second measurement location feature information is determined based on a spatial feature in the current map; and/or the first location feature information contains first visual location feature information, the first visual location feature information is extracted from a first keyframe image in the reference location data set; and the second location feature information contains second visual location feature information, the second visual location feature information is extracted from a second keyframe image in the current location data set.

7. The method for updating a map of claim 6, wherein the first measurement location feature information contains at least one of the followings: measurement data determined based on combination of coordinate information for describing the spatial feature in the reference map, and measurement data determined based on combination of depth information for describing the spatial feature in the reference map; and the second measurement location feature information contains at least one of the followings: measurement data determined based on combination of coordinate information for describing the spatial feature in the current map, and measurement data determined based on combination of depth information for describing the spatial features in the current map.

8. The method for updating a map of claim 4, wherein the step of matching each first location feature information in the reference location data set with each second location feature information in the current location data set comprises:

matching the second location feature information in each second keyframe image in the current location data set with the first location feature information in each first keyframe image in the reference location data set, so as to determine the matched first location feature information in the first keyframe image and second location feature information in the second keyframe image.

9. The method for updating a map of claim 8, further comprising:

analyzing the first keyframe image in the reference location data set, determining a first relative orientation relation between a first image coordinate information corresponding to the first keyframe image and a principal direction of the physical space; and adjusting a pixel position of the first location feature information in the first keyframe image based on the first relative orientation relation; and/or analyzing the second keyframe image in the current location data set, determining a second relative orientation relation between a second image coordinate information corresponding to the second keyframe image and the principal direction of the physical space; and adjusting a pixel position of the second location feature information in the second keyframe image based on the second relative orientation relation;

so as to match the adjusted second location feature information in the second keyframe image with the adjusted first location feature information in the first keyframe image.

10. The method for updating a map of claim 3, further comprising a step of adjusting the reference map or the current map until the two adjusted maps meet preset overlapping conditions, so as to determine the matched first location feature information and corresponding first location coordinate information in the reference location data set as well as second location feature information and corresponding second location coordinate information in the current location data set.

11. The method for updating a map of claim 3, wherein the step of performing the data fusion process on the reference map and the corresponding reference location data set as well as the current map and the corresponding current location data set based on the matched first location feature information and corresponding first location coordinate information as well as second location feature information and corresponding second location coordinate information comprises:

correcting coordinate error(s) in the reference map and/or the current map based on coordinate deviation information between the matched first location coordinate information and second location coordinate information;

performing a merging operation based on the corrected at least one map to obtain a new reference map; and marking at least the matched first location feature information in the reference location data set and second location feature information in the current location data set in the new reference map, so as to obtain new location coordinate information.

12. The method for updating a map of claim 3, wherein the step of performing the data fusion process on the reference map and the corresponding reference location data set as well as the current map and the corresponding current location data set based on the matched first location feature information and corresponding first location coordinate information as well as second location feature information and corresponding second location coordinate information comprises at least one of the following steps, so as to obtain a new reference location data set:

adjusting the reference location data set or the current location data set based on location feature deviation information between the matched first location feature information and second location feature information; and adding each unmatched second location feature information in the current location data set to the reference location data set, or, adding each unmatched first location feature information in the reference location data set to the current location data set.

13. The method for updating a map of claim 1, further comprising a step of sending the new reference map and the corresponding new reference location data set to the first movement device in the physical space.

14. The method for updating a map of claim 1, further comprising a step of marking a position of at least one second device which is configured with an image acquisition device in the physical space in the new reference map.

15. A mobile robot, comprising:

a storage device, configured to store a reference map and a corresponding reference location data set, a current map and a corresponding current location data set, and at least one program;

wherein the current map and the corresponding current location data set are constructed when the mobile robot performs a navigation and movement operation; and the reference map and the corresponding reference location data set are used by the mobile robot in performing the navigation and movement operation;

a movement device, configured to perform a movement operation based on a navigation route determined based on the reference map;

a location sensing device, configured to collect second location feature information during the navigation and movement operation, so as to form the current location data set; and a processing device, connected with the storage device, an image acquisition device and the movement device, and configured to invoke and execute the at least one program, so as to coordinate the storage device, the image acquisition device and the movement device to perform a method for updating a map, wherein, the method comprises:

acquiring the current map and the corresponding current location data set constructed when the mobile robot performs a navigation and movement operation in a physical space, wherein the mobile robot performs the navigation and movement operation based on the reference map and the corresponding reference location data set which are corresponding to the physical space and stored in advance;

detecting integrity of the current map, and/or detecting the amount of information in the current location data set;

performing a data fusion process on the reference map and the corresponding reference location data set as well as the current map and the corresponding current location data set based on the obtained detection results; and taking a map and a corresponding location data set after being data fusion processed as a new reference map and a corresponding new reference location data set in the mobile robot.

16. The mobile robot of claim 15, wherein the stored reference map and corresponding reference location data set are constructed when the mobile robot and/or at least one second movement device respectively perform(s) at least one navigation and movement operation in a same physical space.

17. The mobile robot of claim 16, further comprising an interface device, configured to perform data communication with at least one second movement device, wherein the processing device further configured to acquire a third map and a corresponding third location data set provided by the second movement device, so as to perform a data fusion process on the reference map and the corresponding reference location data set, the second map and the corresponding second location data set, as well as the third map and the corresponding third location data set.

18. A mobile robot, comprising:

an interface device, configured to perform data communication with a server;

a storage device, configured to store a reference map and a corresponding reference location data set used for providing a navigation service during a navigation and movement operation in a physical space, store a current map and a corresponding current location data set constructed during the navigation and movement operation, and store at least one program; and a processing device, connected with the storage device and the interface device, and configured to invoke and execute the at least one program, so as to coordinate the storage device and the interface device to perform the following steps:

sending the current map and the corresponding current location data set to the server; and acquiring a new reference map and a corresponding new reference location data set fed back by the server, and updating the stored reference map and corresponding reference location data set, wherein the acquired new reference map and corresponding new reference location data set are obtained after that the server performs a data fusion process on the reference map and the corresponding reference location data set before being updated, as well as the current map and the corresponding current location data set, and the data fusion process is performed based on a detection result obtained through detecting integrity of the current map, and/or detecting the amount of information in the current location data set.

19. The mobile robot of claim 18, wherein the new reference map and the corresponding new reference location data set are further data fusion processed with a third map and a corresponding third location data set provided by at least one second movement device.

* * * * *